(12) United States Patent
Foster

(10) Patent No.: US 6,625,925 B1
(45) Date of Patent: Sep. 30, 2003

(54) LANDSCAPE EDGING

(76) Inventor: John R. Foster, 51 Paynes La., Stafford, VA (US) 22554

( * ) Notice: Subject to any disclaimer, the term of this patent is extended or adjusted under 35 U.S.C. 154(b) by 18 days.

(21) Appl. No.: 09/776,918

(22) Filed: Feb. 6, 2001

(51) Int. Cl.$^7$ .................................................. A01G 1/00
(52) U.S. Cl. ............................................ 47/33; 52/102
(58) Field of Search .................... 47/33, 25, 32, 47/9; 52/102; 404/6, 7

(56) References Cited

U.S. PATENT DOCUMENTS

| | | | | |
|---|---|---|---|---|
| 4,831,776 A | * | 5/1989 | Fritch | 404/102 |
| 4,934,093 A | * | 6/1990 | Yanna | 404/7 |
| 4,976,063 A | * | 12/1990 | Young | 47/33 |
| D319,560 S | | 9/1991 | Perry | |
| 5,092,076 A | | 3/1992 | Terreta | |
| 5,134,817 A | | 8/1992 | Richardt | |
| 5,157,867 A | * | 10/1992 | Fritch | 404/102 |
| 5,274,950 A | * | 1/1994 | Roberts | 43/121 |
| D344,810 S | | 3/1994 | Nelson | |
| 5,303,523 A | * | 4/1994 | Hand et al. | 52/101 |
| 5,377,447 A | * | 1/1995 | Fritch | 404/7 |
| 5,379,546 A | | 1/1995 | Popp | |
| 5,438,804 A | | 8/1995 | Reum et al. | |
| 5,640,801 A | | 6/1997 | Rynberk | |
| D402,380 S | | 12/1998 | Komoroski | |
| 5,926,999 A | * | 7/1999 | Vernon et al. | 43/121 |
| 5,930,947 A | * | 8/1999 | Eckhoff | 47/33 |

* cited by examiner

*Primary Examiner*—Peter M. Poon
*Assistant Examiner*—Andrea M. Valenti
(74) *Attorney, Agent, or Firm*—Dinesh Agarwal, P.C.

(57) ABSTRACT

A landscape edging includes a modular member with a closed front portion and an open rear portion, and a left or a right open end portion. The modular member further includes a first panel, and a second panel extending at an angle relative to the first panel. Each of the first and second panels includes a free edge portion. The free edge portion of the second panel is disposed closer to the rear portion of the modular member than the front portion thereof. The free edge portion of the second panel is vertically spaced from the free edge portion of the first panel. The first and second panels define a recess therebetween for retaining material, such as mulch, sand, dirt, wood chips, rocks etc. The modular member includes a connecting member for interlocking with the cooperating connecting member of an adjacent modular member. One of the first and second panels includes an anchor for immobilizing the modular member relative to the ground or a structure about the area to be landscaped. A selected area may be landscaped by immobilizing the modular member about the area. More particularly, a plurality of the modular members may be interconnected to provide a straight, curved or a circular edging.

20 Claims, 4 Drawing Sheets

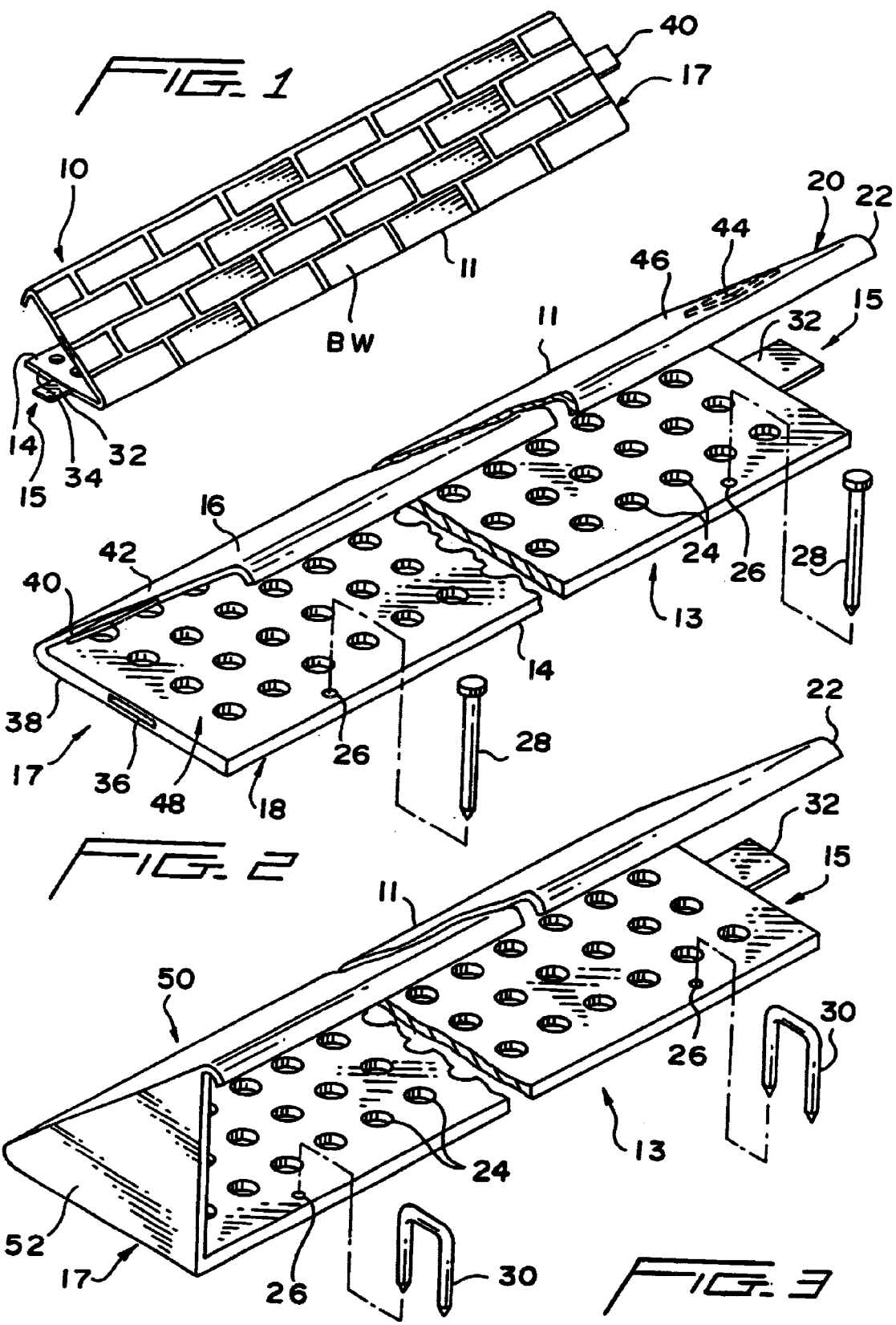

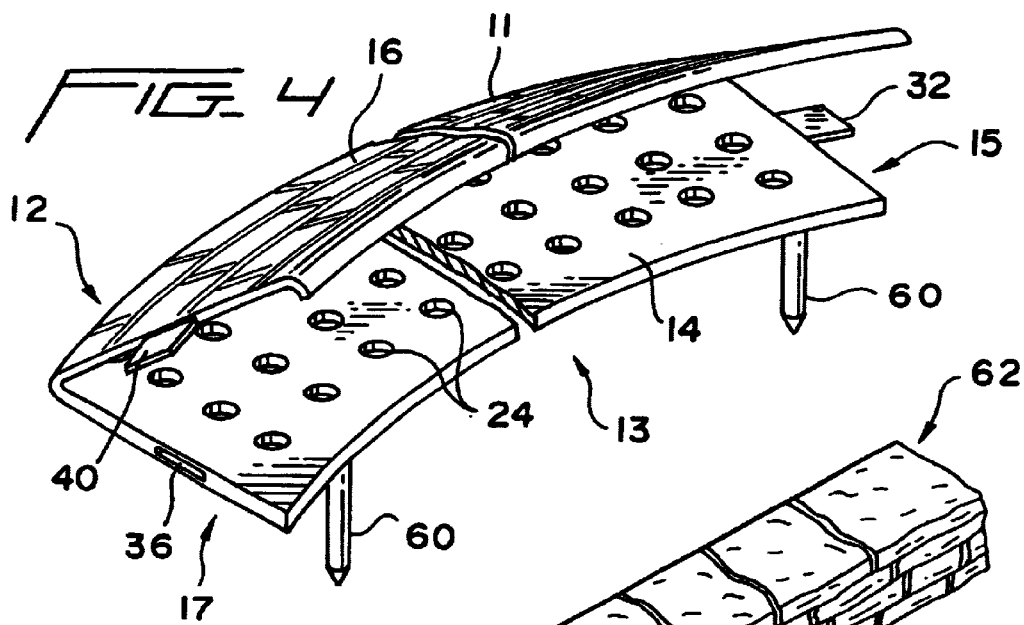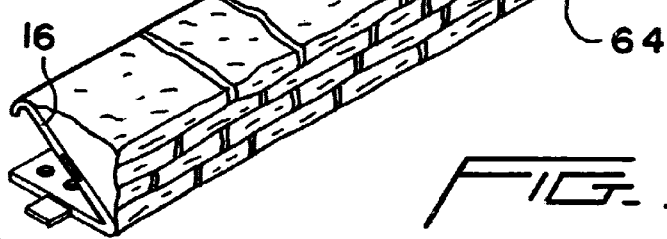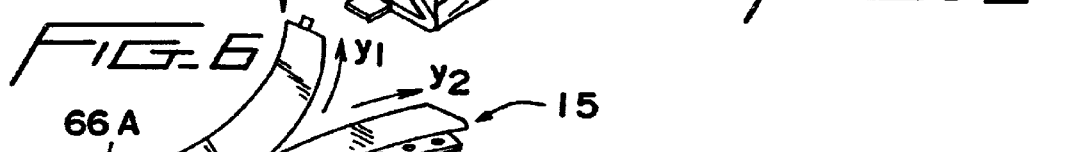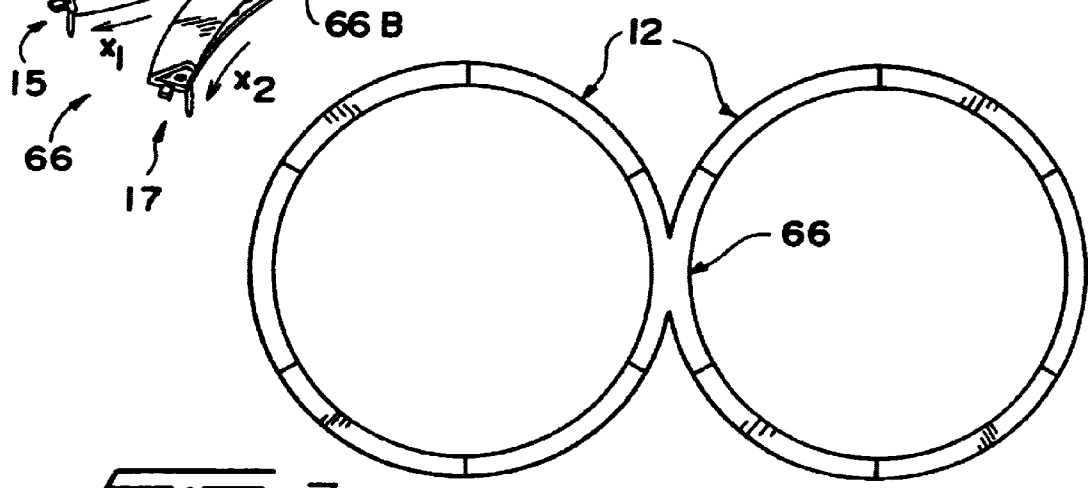

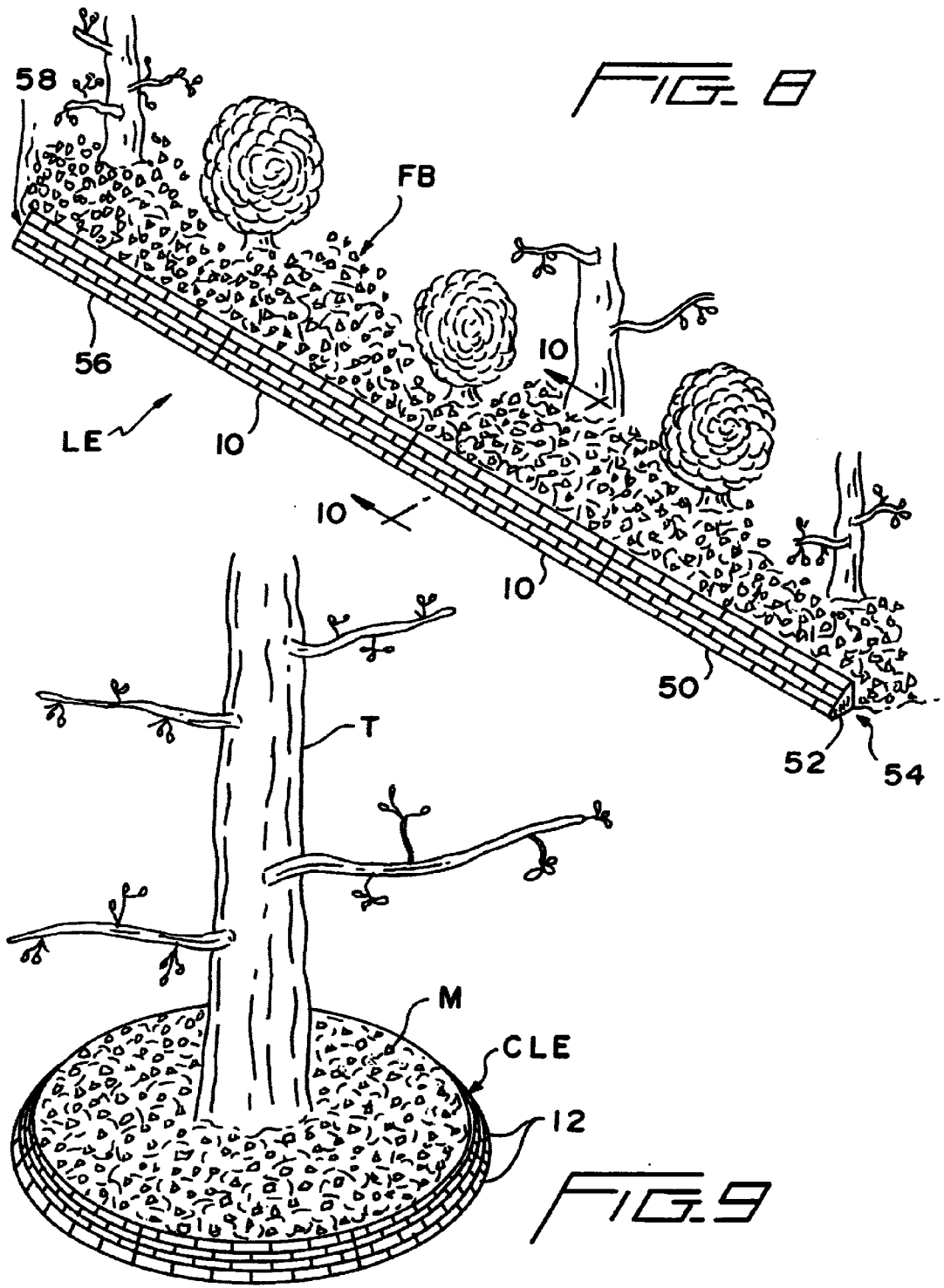

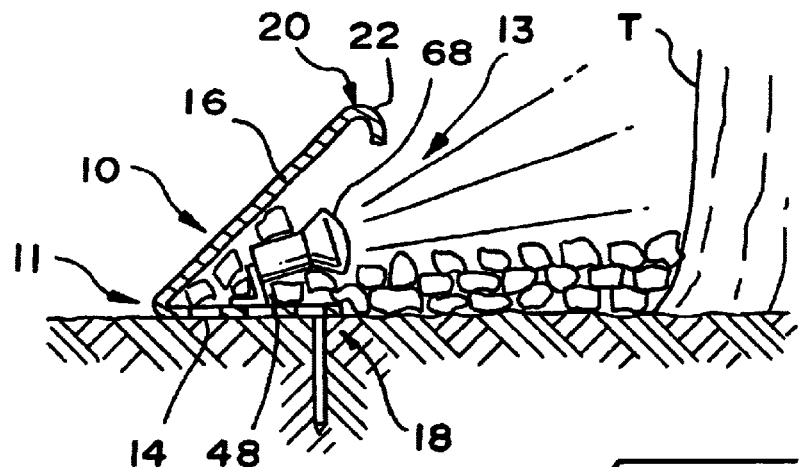
FIG_10
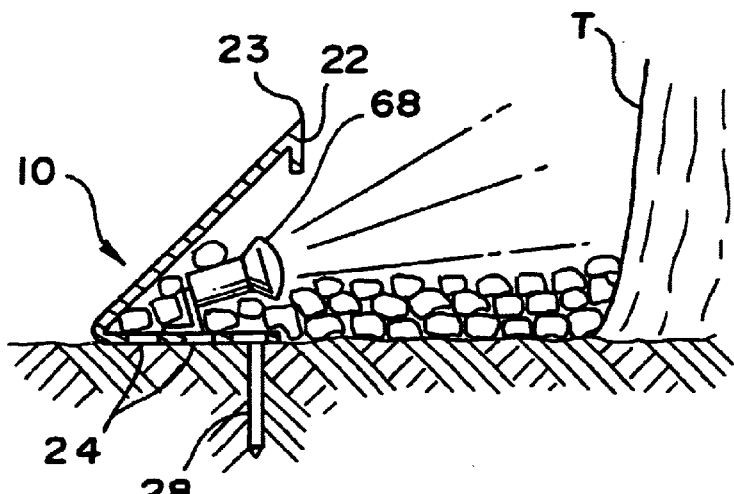
FIG_11
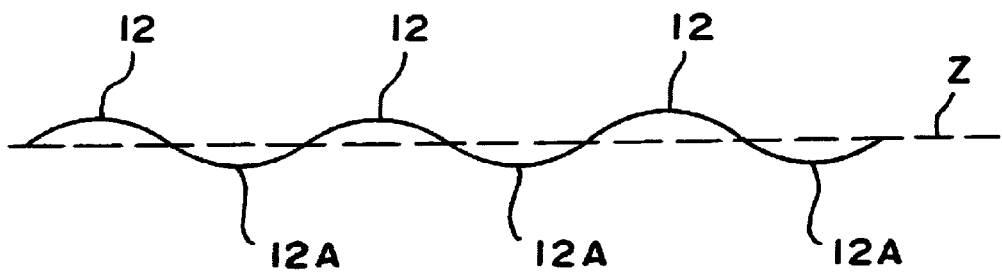
FIG_12

LANDSCAPE EDGING

FIELD AND HISTORICAL BACKGROUND OF THE INVENTION

The present invention is directed to a landscape edging to retain landscaping material, such as mulch, around bushes, trees, flower beds, etc.

In landscaping, it is common to divide different areas to prevent one area from spilling or growing into the next area, or to present a distinct appearance. For instance, landscape edging has been used as a divider between grass and a flower bed to prevent the grass from creeping into the flower bed. It is also typical in landscaping to erect walls and borders to provide a desired accent to improve the appearance of the property and/or to limit movement or migration of the soil material from one area to another. Conventionally, masonry, such as bricks, rocks, stones, concrete, slabs and the like, is used for this purpose.

However, conventional materials suffer from various drawbacks in that, for example, they are difficult to be assembled by a person other than those skilled in landscaping or masonry work, or do not impart a natural, pleasing appearance. In particular, conventional landscape edging does not blend into the environment to present a natural accent, and further does not properly retain or hold, for example, mulch around a tree or flower bed, etc.

Various examples of landscape edging and the like devices are shown in U.S. Pat. Nos. 5,092,076; 5,134,817; 5,377,447; 5,379,546; 5,438,804; 5,640,801; 5,930,947; and U.S. Des. Pat. No. 309,560.

In view of the drawbacks associated with conventional devices, there is a need in the industry for a landscape edging which is simple in design, easy to install without requiring special skill or training, and which presents a natural accent and is pleasing in appearance.

OBJECTS AND SUMMARY OF THE INVENTION

The principal object of the present invention is to provide a landscape edging which overcomes the drawbacks associated with the conventional devices.

Another object of the present invention is to provide a landscape edging which is simple in construction, easy to use and inexpensive to manufacture.

Yet another object of the present invention is to provide a landscape edging which easily blends into a landscape environment and imparts the area or property a natural or pleasing appearance.

An additional object of the present invention is to provide a landscape edging which can be effectively used to retain material, such as mulch, wood chips, rocks, gravel, sand, etc., around bushes, trees, flower beds, etc.

Yet an additional object of the present invention is to provide a landscape edging which includes a desired pattern, such as laid stone, brick, or the like, to give the area a natural and real look.

Yet an additional object of the present invention is to provide a landscape edging which has a three-dimensional appearance and may include surface ornamentation resembling animate or inanimate objects, such as a train, animals, etc.

A further object of the present invention is to provide a landscape edging which is modular in construction such that a worn-out piece can be easily replaced without disturbing or removing the entire edging.

Yet a further object of the present invention is to provide a landscape edging which is straight or curved in configuration to provide the flexibility of, for example, erecting either a straight edging or a curved edging, or to provide a circular edging about a tree.

In accordance with the present invention, a landscape edging includes a modular member with a closed front portion and an open rear portion, and a left or a right open end portion. The modular member further includes a first panel, and a second panel extending at an angle relative to the first panel. Each of the first and second panels includes a free edge portion. The free edge portion of the second panel is disposed closer to the rear portion of the modular member than the front portion thereof. The free edge portion of the second panel is vertically spaced from the free edge portion of the first panel. The first and second panels define a recess therebetween for retaining material, such as mulch, sand, dirt, wood chips, rocks etc. The modular member includes a connecting member for interlocking with the cooperating connecting member of an adjacent modular member. One of the first and second panels includes an anchor for immobilizing the modular member relative to the ground or a structure about the area to be landscaped. A selected area may be landscaped by immobilizing the modular member about the area. More particularly, a plurality of the modular members may be interconnected to provide a straight, curved, or a circular edging.

In summary, the present invention provides a landscape edging which can be easily and effectively used to rapidly erect an edging to retain, for example, mulch about a tree, flower bed, and the like.

BRIEF DESCRIPTION OF THE DRAWINGS

The above and other objects, novel features and advantages of the present invention will become apparent from the following detailed description of the invention illustrated in the accompany drawings, wherein:

FIG. 1 is a top perspective view of a modular member for erecting a landscape edging in accordance with the present invention, shown with a laid brick design;

FIG. 2 is an enlarged rear perspective view of the modular member shown in FIG. 1, shown without any surface design;

FIG. 3 is a view similar to FIG. 2, showing an end modular member;

FIG. 4 is a first alternative embodiment of the modular member shown in FIG. 2;

FIG. 5 is a second alternative embodiment of the modular member shown in FIG. 1;

FIG. 6 illustrates a third embodiment of a modular member constructed by joining two curved modular members, which can be used to erect a circular edging;

FIG. 7 is schematic illustration of a landscape edging erected by using the modular member shown in FIG. 6;

FIG. 8 is an illustration of a landscape edging of the invention, erected by using the modular member shown in FIG. 1;

FIG. 9 is an illustration of a landscape edging erected by using the modular member shown in FIG. 4;

FIG. 10 is an enlarged cross-sectional view taken along line 10—10 of FIG. 8;

FIG. 11 is a view similar to FIG. 10, showing an alternate configuration of the overhang portion; and FIG. 12 is a schematic illustration of a landscape edging erected by using the modular member shown in FIG. 4.

DETAILED DESCRIPTION OF THE INVENTION

As best shown in FIGS. 8–10, landscape edging LE of the present invention is constructed by interconnecting straight or linear modular members 10 (FIG. 8), or curved modular members 12 (FIG. 9). Although, landscape edging LE of the present invention has been illustrated to have been erected in a straight line fashion along a flower bed FB or the like area (FIG. 8), and in a circular fashion around a tree T (FIG. 9), it will have various other desired landscaping applications. (It is noted herewith that similar components of various embodiments illustrated herein have been designated with the same reference numerals.)

As best shown in FIGS. 1–2, the modular member 10 is preferably closed about its front 11, but is open about its rear 13 and left and right end portions 15 and 17.

As best shown in FIGS. 1–2, straight or linear modular member 10 includes a base panel 14, and a front panel 16 that extends upwardly at an angle from the base panel 14. Preferably, the front panel 16 extends at an acute angle (less than 90 degrees) from the base panel 14. The base and front panels 14 and 16 include free edge portions 18 and 20, respectively, that are vertically spaced with each other (FIGS. 2 and 10). The free edge portion 20 of front panel 16 is disposed so as to be closer to rear portion 13 of the modular member 10 than the front 11 thereof.

The free edge portion 20 of the front panel 16 includes an overhang or lip portion 22, which extends vertically downwardly towards the base panel 14. As shown in FIGS. 2–3 and 10, lip 22 is somewhat curved relative to front panel 16, or it may be bent straight downwardly to provide an apex or pointed edge portion 23 between the front panel 16 and the lip 22 (FIG. 11).

As shown in FIG. 1, the front panel 16 is preferably provided with a surface ornamentation that simulates a brick wall BW. It is noted herewith that various other types of surface ornamentations may be provided to resemble or simulate other desired designs, such as rock, stone, masonry, and animate/inanimate objects, such animals, toys, etc.

The base panel 14 is provided with through-holes 24 to allow drainage of fluid, such as water, therethrough. In order to immobilize modular member 10, the base panel 14 includes holes 26 about edge portion 18 through which stakes 28 (FIG. 2) or, alternatively, U-bolts 30 (FIG. 3), may be inserted. Alternatively, stakes 28 may be formed integrally with the base panel 14 (FIG. 4).

As further shown in FIGS. 1–2, the base panel 14 includes a tab 32 about its left end portion 34 and a groove 36 about its right end portion 38. Likewise, the front panel 16 includes a tab 40 about its right edge portion 42 and a groove 44 about its left edge portion 46. As described below, the tab 32 has been configured to be received in the corresponding groove 36 of an adjacently placed modular member, and the tab 40 of the front panel 16 has been configured to be received in the corresponding groove 44 of the adjacent front panel thereof.

The external dimensions of the tabs 32 and 40 are slightly larger than the internal dimensions of the corresponding grooves 36 and 44, respectively, to obtain a frictional locking engagement. It is noted herewith that although tabs 32 and 40, and recesses 36 and 44, are illustrated to be somewhat square in configuration, it is within the scope of the invention to select other shapes and sizes. Also, it is within the scope of the invention to vary the number and arrangement of the tabs and recesses.

The base panel 14 and front panel 16 provide therebetween a recess 48, which is defined by left and right end portions 15 and 17, and the rear end portion 13 of the modular member 10.

FIG. 3 illustrates a modular member 50 which is used as an end modular member in the edging LE (FIG. 8). The end modular member 50 is similar to the modular member 10, with the exception that one of the left and right end portions 15 and 17, is closed by a wall 52. In this regard, it is noted herewith that FIG. 3 illustrates an end modular member 50 whose right end 17 is closed, but the left end portion 15 remains open. One of ordinary skill in the art would appreciate that the end modular member 50, shown in FIG. 3, would be used towards the right end 54 of the landscape edging LE. On the other hand, the end modular member 56, shown on the left end 58 of the landscape edging LE, would have its left end closed by a wall similar to 52.

FIG. 4 illustrates a first alternative embodiment of the modular member of the invention, which is identical to the modular member 10 shown in FIGS. 1–2, with the exception that the modular member 12 is curved in configuration and includes stakes 60 that extends downwardly from the base panel 14 and are integral therewith. As noted below, curved modular members 12 are used to erect a curved or circular edging (FIG. 9). It is noted herewith that modular member 12 may be constructed in a manner to provide a linear generally S-shaped edging. This would be accomplished by alternately interconnecting curved modular members 12 with mirror-image configurations thereof 12A, along a line Z (FIG. 12).

FIG. 5 illustrates a second alternative embodiment of the modular member 62, which is similar to the modular member 10 shown in FIGS. 1–2, with the exception that a three-dimensional rendition of a selected design, such as stacked stones 64, is provided on the front panel 16. It is within the scope of this invention to provide three-dimensional renditions of other designs, such as rocks, bricks, etc.

FIG. 6 illustrates a third alternative embodiment of a modular member 66, which is constructed by joining the curved modular members 12 at the front 11 thereof. In particular, two curved modular members 12 are joined in a face-to-face relationship in a manner that the left end portions 15 of the modular members 66A and 66B extend in opposite directions (see arrows $X_1$ and $Y_2$). Likewise, the right end portions 17 of the modular members 66A and 66B extend in opposite directions (see arrows $Y_1$ and $X_2$). In other words, the left end portion 15 of the modular member 66A and the right end portion 17 of the modular member 66B, are in a diverging relationship to each other (see arrows $X_1$ and $X_2$). In the same manner, the right end portion 17 of the modular member 66A, and the left end portion 15 of the modular member 66B, are also in a diverging relationship (see arrows $Y_1$ and $Y_2$).

As illustrated in FIG. 7, the modular member 66 (FIG. 6) is used to erect a landscape edging that forms a figure '8' configuration. An artisan in the art would appreciate that in order to form this configuration, it would be necessary to use the curved modular member 12, illustrated in FIG. 4.

As illustrated in FIG. 10, a light source 68 may be mounted in the recess 48 to illuminate, for example, the tree T.

The modular members 10 and 12 of the present invention may be made of any suitable rigid, durable material.

Preferably, the modular members 10 and 12 are constructed of metal or molded plastic material, and are generally substantially identical in configuration. Use of other materials, such as composites, wood, molded and cast materials, such as prefabricated concrete, etc., along with other available material may also be made in carrying out the objective of the present invention.

USE AND OPERATION

In order to erect the landscape edging LE of the type shown in FIG. 8 of the present invention, a user would first select a number of modular members 10 that, when placed in a linear configuration, would cover the length of an area (FB) to be landscaped. The user would then proceed to interconnect the modular members beginning, preferably, at the left end 58 of the edging. On the extreme left, the user would place end modular member 56, whose left end 15 is closed, and immobilize it in the ground by the stakes 28 (or U-bolts 30). The user would then place a modular member 10, which is open on both the left and right end portions 15 and 17, and interconnect with the end modular member 56 by using tabs 32 and 40 and corresponding grooves 36 and 44. The user would then proceed to interconnect additional modular members of the type shown in FIGS. 1–2 (having both left and right open ends) and interconnecting in a manner that tabs 32 and 40 are received in corresponding grooves 36 and 44, respectively, of the adjacently placed modular members. Upon reaching the right end 54, the user would interconnect an end modular member 50, disclosed in FIG. 3 (having its right end 17 closed by wall 52). Once all of the modular members have been immobilized respect to each other and relative to the ground, the corresponding recesses 48 of the modular members 10, 50 and 56, may be filled with mulch M, or other material such as sand, gravel, rocks, dirt, etc. A circular landscape edging CLE (FIG. 9) may be erected by placing and interconnecting curved modular members 12, in the same manner.

While this invention has been described as having preferred ranges, steps, materials, or designs, it is understood that it is capable of further modifications, uses and/or adaptations of the invention following in general the principle of the invention and including such departures from the present disclosure as those come within the known or customary practice in the art to which the invention pertains and as may be applied to the central features hereinbefore set forth, and fall within the scope of the invention and of the limits of the appended claims.

What is claimed is:

1. A landscape edging, comprising:
   a) a modular member including a closed front portion and an open rear portion;
   b) said modular member including a left or a right open end portion;
   c) said modular member including a first panel, and a second panel extending at an acute angle relative to said first panel;
   d) each of said first and second panels including a free edge portion;
   e) the free edge portion of said second panel being disposed closer to the rear portion of said modular member than the front portion thereof;
   f) the free edge portion of said second panel being vertically spaced from the free edge portion of said first panel;
   g) the free edge portion of said second panel including a curved lip portion extending towards said first panel;
   h) said first and second panels defining a recess therebetween for retaining a landscaping material;
   i) said first panel for engaging the ground and said second panel extending upwardly at said angle;
   j) said first panel including a drainage hole extending through the thickness thereof and communicating with the ground;
   k) an anchor associated with said first panel, said anchor extending generally transversely to said first panel for extending into the ground for immobilizing said modular member relative to the ground; and
   l) said modular member including a connecting tab member for interlocking with a cooperating connecting groove member of an adjacent modular member;
   m) whereby an area may be landscaped by immobilizing said modular member about the area.

2. The landscape edging of claim 1, wherein:
   a) said recess is defined by the front, rear and left and portions of said modular member.

3. The landscape edging of claim 1, wherein:
   a) said anchor is integrally formed with said first panel.

4. The landscape edging of claim 3, wherein:
   a) said modular member comprises an integral one-piece member.

5. The landscape edging of claim 4, further comprising:
   a) a facia resembling masonry.

6. The landscape edging of claim 1, wherein:
   a) said modular member is substantially linear.

7. The landscape edging of claim 1, wherein:
   a) said modular member is curved.

8. A landscape device comprised of a plurality of modular members interconnectable to form an edging about an area and to retain a material, each of said modular members comprising:
   a) a closed front portion and an open rear portion;
   b) a left or a right open end portion;
   c) a base panel, and a front panel extending upwardly at an acute angle relative to said base panel;
   d) each of said base and front panels being substantially planar and including a free edge portion;
   e) the free edge portion of said front panel being disposed closer to the rear portion of said modular member than the front portion thereof;
   f) the free edge portion of said front panel being vertically spaced from the free edge portion of said base panel and including a curved lip portion extending towards said base panel;
   g) said base and front panels defining a recess therebetween for retaining a landscaping material;
   h) said base panel for engaging the ground and said front panel extending upwardly at said angle;
   i) said base panel including a drainage hole extending through the thickness thereof and communicating with the ground;
   j) said base panel including an anchor extending generally transversely to said base panel for extending into the ground for immobilizing said modular member relative to the ground, said anchor being integral with said base panel; and
   k) said modular member including a connecting tab member for interlocking with a cooperating connecting groove member of an adjacent modular member;
   l) whereby an area may be landscaped by immobilizing said modular member about the area and filling said recess with a landscaping material.

9. The landscape device of claim 8, wherein:
a) said front panel includes a front surface resembling masonry.

10. The landscape device of claim 8, further comprising:
a) a facia resembling masonry mounted on said front panel.

11. The landscape device of claim 10, wherein:
a) said facia is integral with said front panel.

12. The landscape device of claim 10, wherein:
a) said modular member is substantially linear.

13. The landscape device of claim 8, wherein:
a) said modular member is curved.

14. The landscape device of claim 13, wherein:
a) two of said curved modular members are joined about the front portions thereof such that one of the left and right end portions of said two of said curved modular members extend in diverging directions.

15. The landscape device of claim 8, further comprising:
a) a light emitting member positioned in said recess to direct light towards the rear portion of said modular member.

16. A method of forming an edging about an area, comprising the steps of:
a) providing a plurality of modular members, each said modular member comprising:
 i) a closed front portion and an open rear portion;
 ii) a left or a right open end portion;
 iii) a base panel, and a front panel extending upwardly at an acute angle relative to said base panel;
 iv) each of said base and front panels being substantially planar and including a free edge portion;
 v) the free edge portion of said front panel being disposed closer to the rear portion of said modular member than the front portion thereof;
 vi) the free edge portion of said front panel being vertically spaced from the free edge portion of said base panel and including a curved lip portion extending towards said base panel;
 vii) said base and front panels defining a recess therebetween for retaining a landscaping material;
 viii) said base panel for engaging the ground and said front panel extending upwardly at said angle;
 ix) said base panel including a drainage hole extending through the thickness thereof and communication with the ground;
 x) an anchor associated with said base panel, said anchor extending generally transversely to said base panel for extending into the ground for immobilizing said modular member relative to the ground; and
 xi) said modular member including a connecting tab member for interlocking with a cooperating connecting groove member of an adjacent modular member;
b) immobilizing one of said modular members relative to an area;
c) interlocking another of said modular members with said one of said modular member and immobilizing relative to the area in the same manner as in step b);
d) repeating step c) until a preselected length of the area is covered by the modular members; and
e) filling the recesses of said interconnected modular members with a landscaping material selected from the group consisting of mulch, rocks, leaves, wood chips, sand, and dirt.

17. A landscape device comprised of a plurality of modular members interconnectable to form an edging about an area and to retain a material, each of said modular members comprising:
a) a closed front portion and an open rear portion;
b) a left or a right open end portion;
c) a base panel, and a front panel extending upwardly at an acute angle relative to said base panel;
d) each of said base and front panels being substantially planar and including a free edge portion;
e) the free edge portion of said front panel being disposed closer to the rear portion of said modular member than the front portion thereof;
f) the free edge portion of said front panel being vertically spaced from the free edge portion of said base panel and including a lip portion extending towards said base panel;
g) said base and front panels defining a recess therebetween for retaining a material;
h) said base panel including an anchor for immobilizing said modular member relative to the ground or a structure about an area to be landscaped, said anchor being integral with said base panel;
i) said modular member including a connecting member for interlocking with a cooperating connecting member of an adjacent modular member; and
j) a light emitting member positioned in said recess to direct light towards the rear portion of said modular member;
k) whereby an area may be landscaped by immobilizing said modular member about the area and filling said recess with a material.

18. The landscape device of claim 17, wherein:
a) said modular member is substantially linear.

19. The landscape device of claim 17, wherein:
a) said modular member is curved.

20. The landscape device of claim 17, wherein:
a) said base panel includes a drainage hole.

* * * * *